(12) United States Patent
Chen

(10) Patent No.: US 6,324,937 B1
(45) Date of Patent: Dec. 4, 2001

(54) BRAKE LEVER ASSEMBLY FOR ENGAGING TWO BRAKE CABLES

(76) Inventor: Tse-Min Chen, No. 14, Lane 69, Tian Jin Road Section 4., Pei Tun Dist., Taichung City (TW)

(*) Notice: Subject to any disclaimer, the term of this patent is extended or adjusted under 35 U.S.C. 154(b) by 0 days.

(21) Appl. No.: 09/567,037

(22) Filed: May 8, 2000

(51) Int. Cl.[7] ........................................... F16C 1/10
(52) U.S. Cl. ............................. 74/502.2; 74/501.6
(58) Field of Search .............. 74/501.6, 502.1–502.4, 74/502.6, 489; 411/378, 395, 400, 418

(56) References Cited

U.S. PATENT DOCUMENTS

| | | | |
|---|---|---|---|
| 4,644,816 | * 2/1987 | Cockburn | 74/502.2 |
| 4,850,241 | * 7/1989 | Buckley et al. | 74/502.2 |
| 5,778,729 | * 7/1998 | Tsai | 74/489 |
| 5,906,140 | * 5/1999 | Smith | 74/502.2 |
| 5,946,978 | * 9/1999 | Yamashita | 74/502.2 |
| 5,966,993 | * 10/1999 | Ekins | 74/502.2 |
| 6,085,611 | * 7/2000 | Valdez | 74/501.6 |
| 6,257,087 | * 7/2001 | Lee | 74/502.1 |

FOREIGN PATENT DOCUMENTS

| | | | |
|---|---|---|---|
| 1053160 | * 2/1954 | (FR) | 74/502.2 |
| 1326831 | * 4/1963 | (FR) | 74/502.2 |
| 8668 | * of 1915 | (GB) | 74/502.2 |

* cited by examiner

Primary Examiner—David A. Bucci
Assistant Examiner—Chong H. Kim

(57) ABSTRACT

A brake lever assembly includes a frame having a lever pivotably connected to a first end of the frame and a fastening device connected to a bottom of the frame. Two engaging slots are defined in a first end of the brake lever so as to engage two brake cables. A bolt member threadedly engaged with a second end of the frame and includes a head and a threaded shank. The threaded shank has two grooves defined longitudinally in an outside thereof so as to received the two brake cables and the head has two passages communicating with the two grooves so that the brake cables extend through the passages.

5 Claims, 4 Drawing Sheets

BRAKE LEVER ASSEMBLY FOR ENGAGING TWO BRAKE CABLES

FIELD OF THE INVENTION

The present invention relates to a brake lever assembly used in stunt bicycle and the brake lever assembly engages with two brake cables.

BACKGROUND OF THE INVENTION

A stunt bicycle generally includes a handlebar assembly that is allowed to be freely rotated relative to the head tube so that the rider can fix the front wheel and rotates the bicycle frame to perform a special stunt. In order to prevent the brake cables from tangling the handlebar or the head tube when rotating the handlebar, a rotatable device is connected to the head tube and two brake cables are respectively connected to the rotatable device. The rotatable device includes two independent parts and the brake cables are connected to the top part so that when rotating the handlebar, the lower part remained still and the two brake cables are co-rotated with the top part. This feature can be achieved by combining the two brake cables into one braid which is then connected to the brake lever so that when pulling the brake lever, the braid is pulled and the two brake cables are actuated. However, to combine the two brake cables is difficult for the riders and the two brake cables will apply different forces to the respective brake caliper because the way that winds the two brake cables affects the transportation of the brake force. The winding portion of the brake cables tends to be broken because the stress concentration.

The present invention intends to provide a brake lever assembly which has two engaging slots so as to respectively engage two brake cables individually.

SUMMARY OF THE INVENTION

In accordance with one aspect of the present invention, there is provided a brake lever assembly and comprising a frame with a lever pivotably connected to a first end of the frame and a fastening means connected to a bottom of the frame. Two engaging slots are defined in a first end of the brake lever so as to engage two brake cables. A bolt member has a head and a threaded shank extending from the head. The threaded shank is longitudinally and threadedly connected to a second end of the frame and two grooves are defined longitudinally in an outside of the threaded shank. The head has two passages defined therethrough and the two passages communicate with the two grooves which communicate with the two slots in the frame. The two brake cables extend from the lever and are engaged with the grooves and extend from the passages of the bolt member.

The object of the present invention is to provide a brake lever assembly for a stunt bicycle wherein two individual brake cables are connected to the brake lever assembly.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
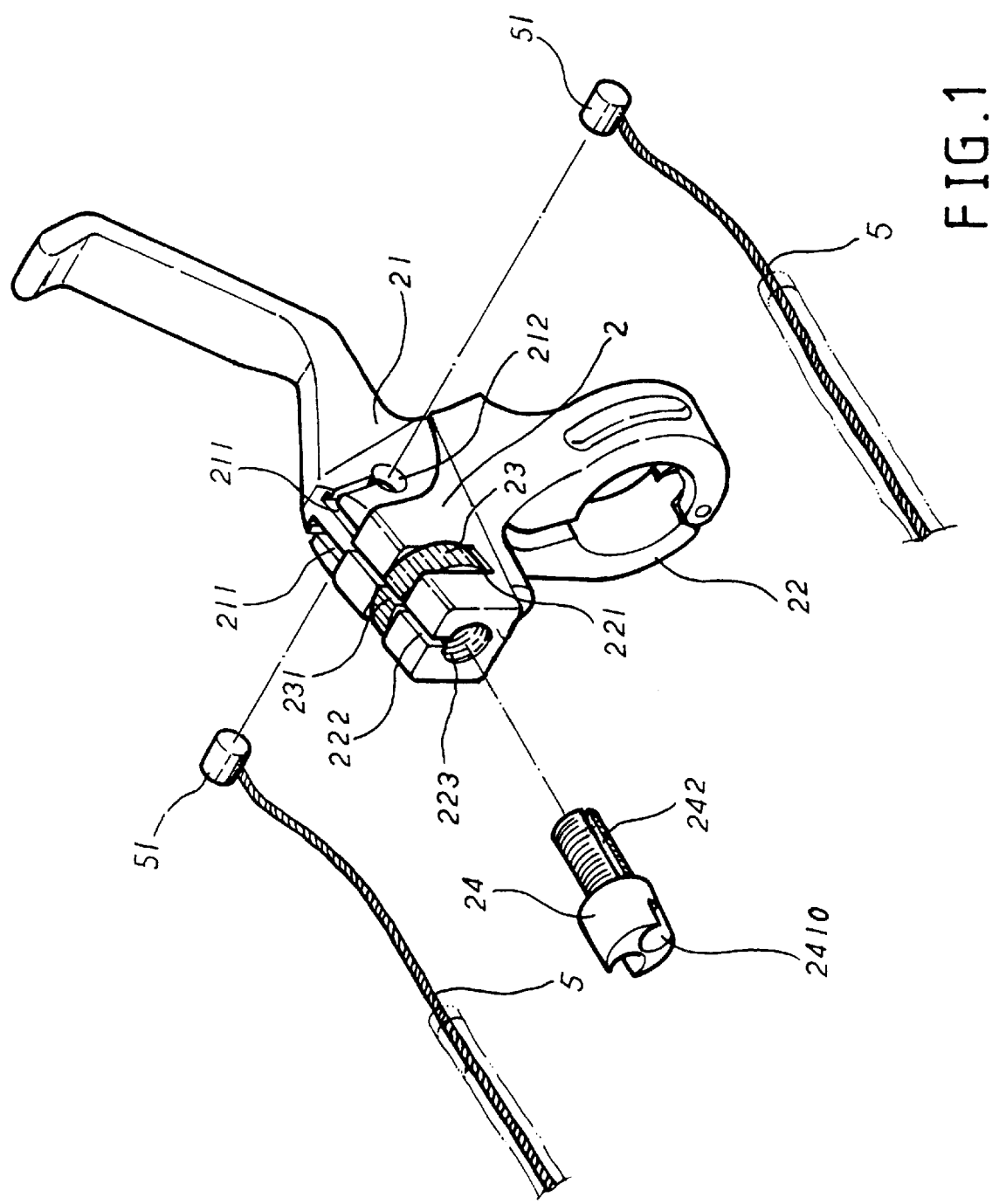
FIG. 1 is an exploded view to show a brake lever assembly in accordance with the present invention.
Figure 2:
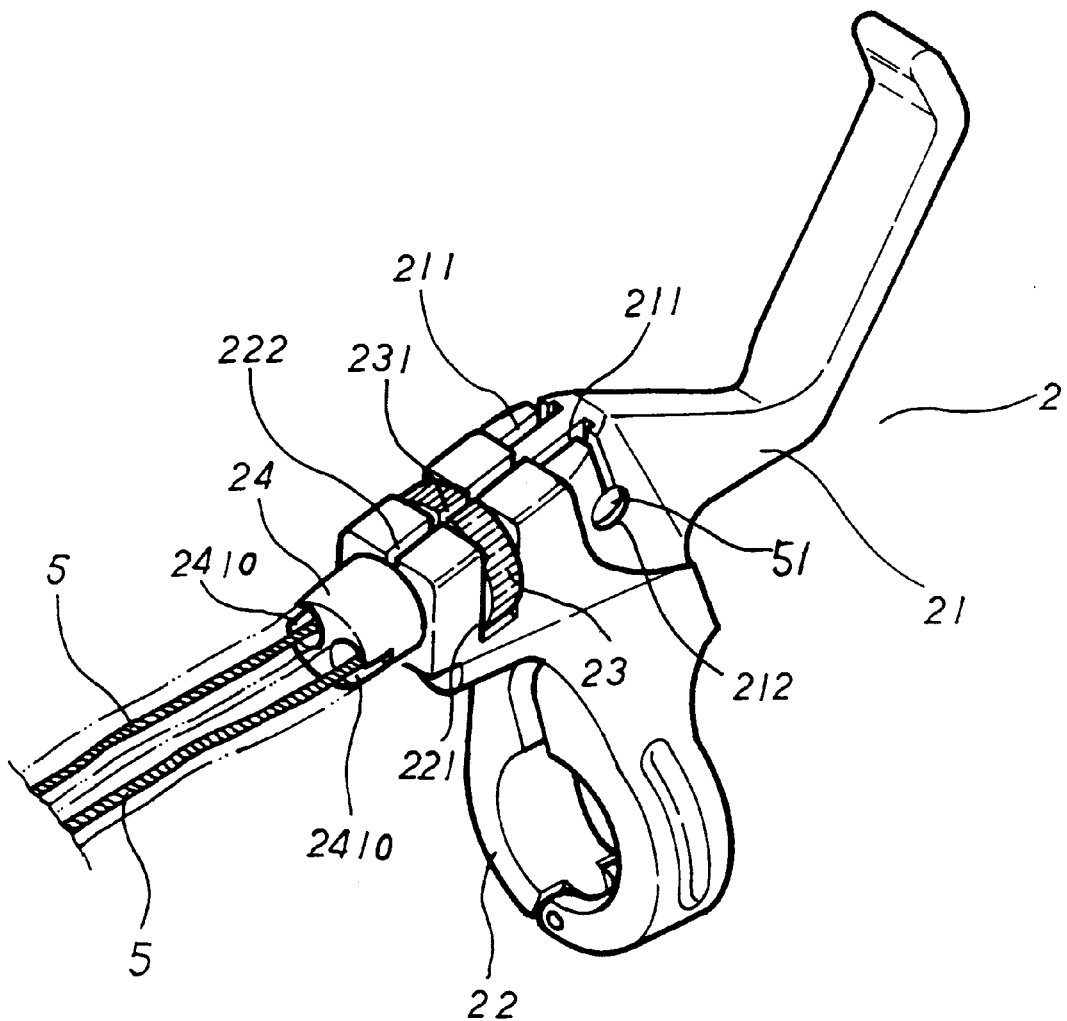
FIG. 2 is a perspective view to show the brake lever assembly and two brake cables are engaged with the brake lever assembly of the present invention.
Figure 3:
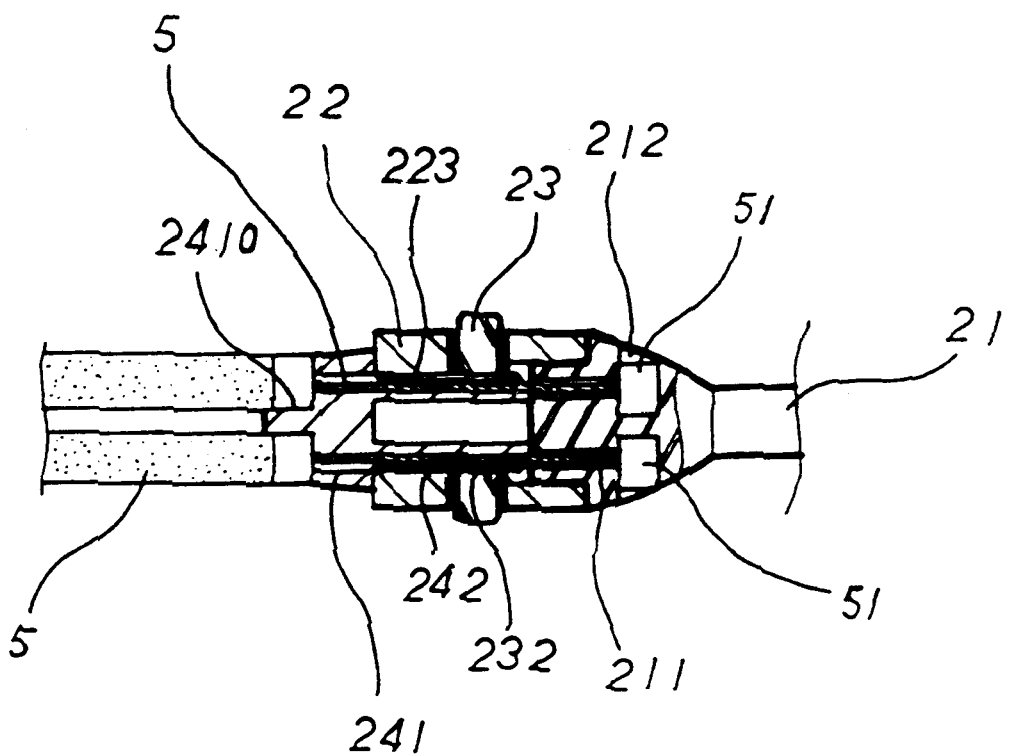
FIG. 3 is a side elevational view, partly in section, of brake lever assembly and the two brake cables.
Figure 4:
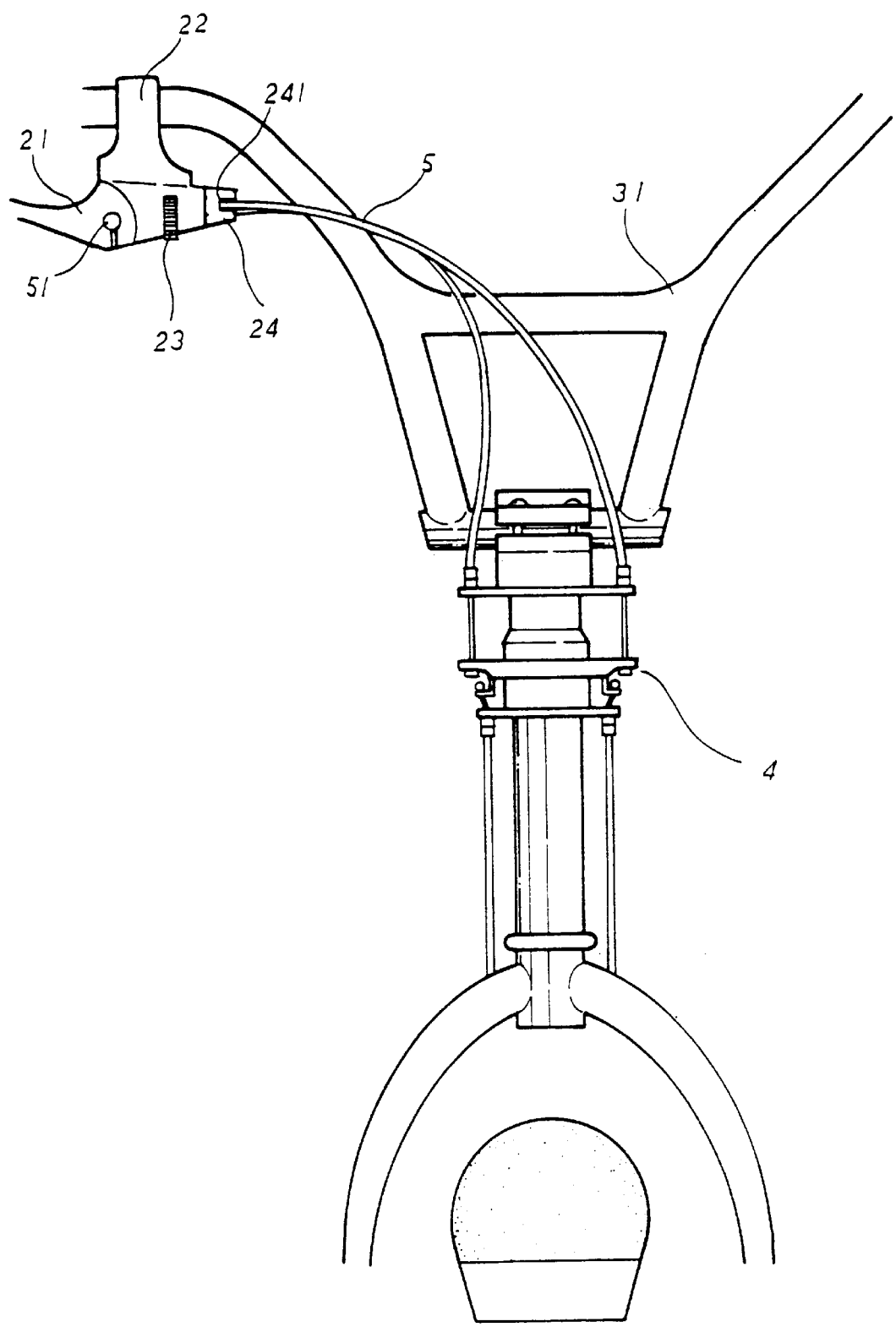
FIG. 4 is an illustrative view to show the brake lever assembly of the present invention used on a stunt bicycle.

Referring to FIGS. 1 to 3, the brake lever assembly in accordance with the present invention comprises a frame 2 having a fastening means 22 connected to a bottom of the frame 2 so as to be fixedly connected to a handlebar 31 of a bicycle as shown in FIG. 4. A lever 21 is pivotably connected to a first end of the frame 2 and two engaging slots 211 are defined in a first end of the brake lever 21. Two notches 212 are defined in two sides of the first end of the brake lever 21 and the two notches 212 communicate with the two slots 211 so that the two respective end blocks 51 of two brake cables 5 are engaged with the notches 212 and the brake cables 5 are engaged with the slots 211. A threaded hole 223 is defined in a second end of the frame 2.

A bolt member has a head 24 and a threaded shank extends from the head 24. Two grooves 242 are defined longitudinally in an outside of the threaded shank and the head 24 has two passages 241 defined therethrough. The threaded shank is longitudinally and threadedly engaged with the threaded hole 223. The two passages 241 communicate with the two grooves 242 and the two grooves 242 communicate with the two slots 211 in the frame 2. A collar 23 is transversely engaged in the a concavity 221 defined in a top of the frame 2 and the threaded shank of the bolt member threadedly extends through the collar 23. The second end of the frame 2 and the collar 23 respectively have a slit 222/231 defined in a top thereof and the two slits 222, 231 communicate the threaded hole 223. Two enlarged recesses 2410 are defined in the head 24 and respectively communicate with the two grooves 242. The two brake cables 5 are engaged with the grooves 242 and extend through the passages 241 and the enlarged recesses 2410. The sheath of each brake cable 5 is then engaged with the enlarged notch 2410. As shown in FIG. 4, the other end of each brake cable 5 is connected to a rotatable means 4.

Accordingly, the brake lever assembly of the present invention connects two individual brake cables 5 and the brake cables 5 need not to be wound together. This is especially advantageous for the stunt bicycle because the brake cables can be replaced individually.

While we have shown and described various embodiments in accordance with the present invention, it should be clear to those skilled in the art that further embodiments may be made without departing from the scope and spirit of the present invention.

What is claimed is:

1. A brake lever assembly comprising:

a frame having a lever pivotably connected to a first end of said frame and a fastening means connected to a bottom of said frame, two engaging slots defined in a first end of said brake lever so as to be adapted to engaged two brake cables, and a bolt member having a head and a threaded shank extending from said head, two grooves defined longitudinally in an outside of said threaded shank and said head having two passages defined therethrough, said two passages communicating with said two grooves and said two grooves communicating with said two slots in said frame, said threaded shank longitudinally and threadedly connected to a threaded hole defined in a second end of said frame and said grooves adapted to receive the two brake cables.

2. The brake lever assembly as claimed in claim 1 further comprising two enlarged recesses defined in said head and respectively communicating with said two grooves.

3. The brake lever assembly as claimed in claim 1 further comprising two notches defined in two sides of said first end of said brake lever, said two notches communicating with said two slots so as to be adapted to engage end blocks of the brake cables.

4. The brake lever assembly as claimed in claim 1 further comprising a concavity defined in a top of said frame and a collar transversely engaged in said concavity, said threaded shank of said bolt member threadedly extending through said collar.

5. The brake lever assembly as claimed in claim 4 further comprising a slit defined through said collar and a slit defined in a top of said frame, said two slits communicating with said threaded hole defined in said second end of said frame.

\* \* \* \* \*